US011400928B2

(12) United States Patent
Hu

(10) Patent No.: US 11,400,928 B2
(45) Date of Patent: Aug. 2, 2022

(54) DRIVERLESS VEHICLE TESTING METHOD AND APPARATUS, DEVICE AND STORAGE MEDIUM

(71) Applicant: APOLLO INTELLIGENT DRIVING TECHNOLOGY (BEIJING) CO., LTD., Beijing (CN)

(72) Inventor: Taiqun Hu, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 115 days.

(21) Appl. No.: 15/991,399

(22) Filed: May 29, 2018

(65) Prior Publication Data
US 2018/0354512 A1 Dec. 13, 2018

(30) Foreign Application Priority Data
Jun. 9, 2017 (CN) .......................... 201710431818.2

(51) Int. Cl.
B60W 30/095 (2012.01)
G07C 5/08 (2006.01)
B60W 50/00 (2006.01)

(52) U.S. Cl.
CPC ....... B60W 30/0956 (2013.01); G07C 5/0841 (2013.01); B60W 2050/0031 (2013.01); B60W 2050/0088 (2013.01)

(58) Field of Classification Search
CPC . B60W 2050/0031; B60W 2050/0088; B60W 30/0956; G07C 5/0841
See application file for complete search history.

(56) References Cited

U.S. PATENT DOCUMENTS

| 9,646,428 | B1* | 5/2017 | Konrardy | G08G 1/147 |
| 10,007,263 | B1* | 6/2018 | Fields | B60K 35/00 |
| 10,145,684 | B1* | 12/2018 | Tofte | G06Q 40/08 |
| 2016/0314224 | A1* | 10/2016 | Wei | G06F 30/20 |
| 2017/0124781 | A1* | 5/2017 | Douillard | G01S 15/931 |
| 2017/0139411 | A1* | 5/2017 | Hartung | G05D 1/0077 |
| 2017/0169623 | A1* | 6/2017 | Chen | G07C 5/02 |
| 2017/0291602 | A1* | 10/2017 | Newman | G08G 1/16 |
| 2018/0060467 | A1* | 3/2018 | Schulte | B60W 30/0956 |
| 2019/0050520 | A1* | 2/2019 | Alvarez | G06F 30/20 |

* cited by examiner

Primary Examiner — Frederick M Brushaber
Assistant Examiner — Matthew J. Reda
(74) Attorney, Agent, or Firm — Lando & Anastasi, LLP

(57) ABSTRACT

The present disclosure provides a driverless vehicle testing method and apparatus, a device and a storage medium, wherein the method comprises: obtaining traffic scenario data of a traffic accident happening on a real road; constructing sensor data needed by travel of the driverless vehicle according to the traffic scenario data; performing simulation of a testing scenario according to the traffic scenario data; performing test for the driverless vehicle's capability of dealing with the traffic accident according to the sensor data and testing scenario. The solution of the present disclosure may be applied to improve accuracy of testing results.

12 Claims, 3 Drawing Sheets

DRIVERLESS VEHICLE TESTING METHOD AND APPARATUS, DEVICE AND STORAGE MEDIUM

The present application claims the priority of Chinese Patent Application No. 2017104318182, filed on Jun. 9, 2017, with the title of "Driverless vehicle testing method and apparatus, device and storage medium". The disclosure of the above applications is incorporated herein by reference in its entirety.

FIELD OF THE DISCLOSURE

The present disclosure relates to driverless vehicle technologies, and particularly to a driverless vehicle testing method and apparatus, a device and a storage medium.

BACKGROUND OF THE DISCLOSURE

A driverless vehicle, also called an autonomous vehicle, means that the vehicle's surroundings are sensed by sensors, and the vehicle's steering and speed are controlled according to road, vehicle position and obstacle information obtained from the sensing so that the vehicle can safely and reliably travel on the road.

It is an important mission for driverless driving technology to effectively prevent and avoid traffic accidents and ensure safety of vehicles and passengers. Therefore, it is necessary to test the driverless vehicle's capability of dealing with traffic accidents, and correspondingly to build a testing scenario.

In the prior art, it is usual to employ a manner of artificially building a simulated testing scenario. However, the traffic accident scenario is very complicated. It is very difficult for an artificially-built scenario to reflect real situations so that the testing results are not accurate enough.

SUMMARY OF THE DISCLOSURE

In view of the above, the present disclosure provides a driverless vehicle testing method and apparatus, a device and a storage medium, which can improve accuracy of the testing results.

Specific technical solutions are as follows:

A driverless vehicle testing method, comprising:

obtaining traffic scenario data of a traffic accident happening on a real road;

constructing sensor data needed by travel of driverless vehicle according to the traffic scenario data;

performing simulation of a testing scenario according to the traffic scenario data;

performing test for the driverless vehicle's capability of dealing with the traffic accident according to the sensor data and testing scenario.

According to a preferred embodiment of the present disclosure, the obtaining traffic scenario data of the traffic accident happening on a real road comprises:

obtaining vehicle data collected by vehicles in the traffic accident, and obtaining monitoring data of a traffic monitoring platform.

According to a preferred embodiment of the present disclosure, the obtaining traffic scenario data of the traffic accident happening on a real road comprises:

obtaining traffic scenario data in a time period between a time point which is at a predetermined time length before time of happening of the traffic accident and the time of happening of the traffic accident.

According to a preferred embodiment of the present disclosure, the constructing sensor data needed by travel of driverless vehicle according to the traffic scenario data comprises:

setting the driverless vehicle as playing different roles in the traffic accident, and constructing the sensor data needed by travel of the driverless vehicle with respect to each role;

the performing test for the driverless vehicle's capability of dealing with the traffic accident according to the sensor data and testing scenario comprises:

with respect to each role, using the driverless vehicle to replace a vehicle corresponding to the role, and testing the driverless vehicle's capability of dealing with the traffic accident according to the sensor data and testing scenario corresponding to the role.

According to a preferred embodiment of the present disclosure, after testing the driverless vehicle's capability of dealing with the traffic accident, the method further comprises:

if the test passes, providing the sensor data to an on-the-spot testing system so that the on-the-spot testing system tests the driverless vehicle's capability of dealing with the traffic accident in a real testing scenario according to the sensor data.

A driverless vehicle testing apparatus, comprising an obtaining unit and a testing unit;

the obtaining unit is configured to obtain traffic scenario data of a traffic accident happening on a real road;

the testing unit is configured to construct sensor data needed by travel of driverless vehicle according to the traffic scenario data, perform simulation of a testing scenario according to the traffic scenario data, and test the driverless vehicle's capability of dealing with the traffic accident according to the sensor data and testing scenario.

According to a preferred embodiment of the present disclosure, the obtaining unit is configured to obtain vehicle data collected by vehicles in the traffic accident, and obtain monitoring data of a traffic monitoring platform.

According to a preferred embodiment of the present disclosure, the obtaining unit is configured to obtain traffic scenario data in a time period between a time point which is at a predetermined time length before time of happening of the traffic accident and the time of happening of the traffic accident.

According to a preferred embodiment of the present disclosure, the testing unit is further configured to set the driverless vehicle as playing different roles in the traffic accident, and construct the sensor data needed by travel of the driverless vehicle with respect to each role;

with respect to each role, use the driverless vehicle to replace the vehicle playing this role, and test the driverless vehicle's capability of dealing with the traffic accident according to the sensor data and testing scenario corresponding to the role.

According to a preferred embodiment of the present disclosure, the testing unit is further configured to if the test passes, provide the sensor data to an on-the-spot testing system so that the on-the-spot testing system tests the driverless vehicle's capability of dealing with the traffic accident in a real testing scenario according to the sensor data.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to the solutions of the present disclosure, the traffic scenario data may be obtained for a traffic accident happening on a real road, then the sensor data needed by travel of driverless vehicle may be constructed according to the obtained traffic scenario data, simulation of the testing scenario is performed according to the obtained traffic scenario data, and the driverless vehicle's capability of dealing with the traffic accident is tested according to the constructed sensor data and testing scenario. Since the simulated testing scenario is constructed according to the traffic scenario data corresponding to the traffic accident that really happens, and furthermore, the driverless vehicle's sensor data also come from the traffic scenario data corresponding to the traffic accident that really happens, the obtained testing scenario and testing procedure can better reflect real situations and thereby improve the accuracy of the testing results.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
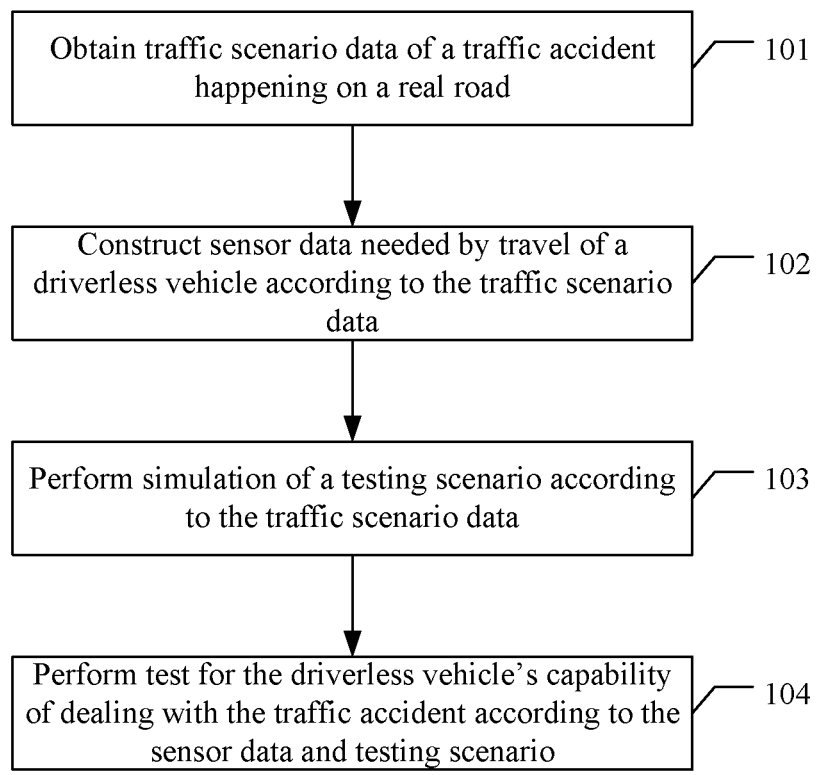
FIG. 1 is a flow chart of a first embodiment of a driverless vehicle testing method according to the present disclosure.

FIG. 1 is a flow chart of a first embodiment of a driverless vehicle testing method according to the present disclosure. As shown in FIG. 1, the embodiment comprises the following specific implementation mode.

In 101 is obtained traffic scenario data of a traffic accident happening on a real road.

Regarding the traffic accident happening on a real road, it is feasible to obtain vehicle data collected by vehicles in the traffic accident, and obtain monitoring data of a traffic monitoring platform.

The vehicle data may comprise images, point cloud, a Global Positioning System GPS, a vehicle travel trajectory and the like. The monitoring data may comprise monitoring pictures and the like.

In practical application, it is feasible to obtain traffic scenario data in a time period between a time point which is at a predetermined time length before time of happening of the traffic accident and the time of happening of the traffic accident.

For example, it is feasible to obtain the traffic scenario data in a time period between three minutes before the time of happening of the traffic accident to the time of happening of the traffic accident.

In 102, sensor data needed by travel of driverless vehicle is constructed according to the traffic scenario data.

The driverless vehicle comprises many kinds of sensors such as a laser radar, an image sensor, a millimeter-wave radar, an ultrasonic radar, an infrared sensor, a GPS, an Inertial Measurement Unit IMU and the like.

The driverless vehicle may perform an operation such as decision-making control in combination with sensors, thereby implementing automatic travel of the driverless vehicle.

It is feasible to perform processing for data in the traffic scenario data, such as multi-sensor data cross validation, secondary processing, data fusion and the like, to construct data of sensors needed by the travel of the driverless vehicle. A specific implementation is of the prior art.

In 103, simulation of the testing scenario is performed according to the traffic scenario data.

It is feasible to perform processing for data in the traffic scenario data, such as multi-sensor data cross validation, secondary processing, data fusion and the like, to construct a simulated testing scenario, thereby restoring a traffic scenario corresponding to the real traffic accident as much as possible, for example restoring vehicles included in the traffic scenario, a position of each vehicle, a travel speed and direction of each vehicle and the like.

How to simulate the testing scenario is of the prior art.

In 104, test is performed for the driverless vehicle's capability of dealing with the traffic accident according to the constructed sensor data and testing scenario.

After the sensor data and testing scenario are constructed, the driverless vehicle may be used to replace the vehicle of the traffic scenario, thereby performing test for the driverless vehicle's capability of dealing with the traffic accident.

Upon testing, the constructed sensor data are used as the driverless vehicle's sensor data, and the driverless vehicle may perform an operation such as the vehicle's decision-making control according to the sensor data.

As can be seen from the above, the solution stated in the above embodiment is employed to construct the simulated testing scenario according to the traffic scenario data corresponding to the traffic accident that really happens, and furthermore, the driverless vehicle's sensor data also come from the traffic scenario data corresponding to the traffic accident that really happens. Therefore, the obtained testing scenario and testing procedure can better reflect real situations and thereby improve the accuracy of the testing results.

In addition, a role of the driverless vehicle may be changed when the test is performed.

Correspondingly, upon constructing the sensor data needed by the travel of the driverless vehicle according to the traffic scenario data, it is possible to set the driverless vehicle as playing different roles in the traffic accident, and construct the sensor data needed by travel of the driverless vehicle with respect to each role.

Different roles may comprise: no responsible, semi-responsible and totally responsible.

As such, when the driverless vehicle's capability of dealing with the traffic accident is tested according to the sensor data and the testing scenario, it is feasible to, for each role, use the driverless vehicle to replace the vehicle playing this role, and test the driverless vehicle's capability of dealing with the traffic accident according to the sensor data and testing scenario corresponding to the role.

For example, it is feasible to first replace a vehicle that is no responsible in the traffic scenario with the driverless vehicle to perform test for the driverless vehicle, then replace a vehicle that is semi-responsible in the traffic scenario with the driverless vehicle to perform test for the driverless vehicle, and then replace a vehicle that is totally responsible in the traffic scenario with the driverless vehicle to perform test for the driverless vehicle, to text the driverless vehicle's capability of dealing with the traffic accident, for example, whether the driverless vehicle, upon serving as the vehicle that is totally responsible, can avoid the happening of the traffic accident.

The test of the driverless vehicle changing different roles is implemented in the above processing manner, thereby sufficiently using the testing data and testing scenario, increasing the testing intensity and reducing the scenario-constructing costs. In addition, after the test in the simulated testing scenario passes, it is feasible to provide the constructed sensor data to an on-the-spot testing system so that the on-the-spot testing system tests the driverless vehicle's capability of dealing with the traffic accident in the real testing scenario according to the sensor data.

That is, it is possible, in the real testing scenario, use the constructed sensor data to simulate respective real sensor data, validate the driverless vehicle's actual vehicle-controlling capability, and further evaluate and analyze the driverless vehicle's capability of dealing with the traffic accident.

Likewise, the driverless vehicle's capability of dealing with the traffic accident in different roles may be tested respectively.

Plural validation of the on-the-spot test and simulation test is achieved in the above processing manner, thereby further improving the testing performance and ensuring the driverless vehicle's travel safety.

Figure 2:
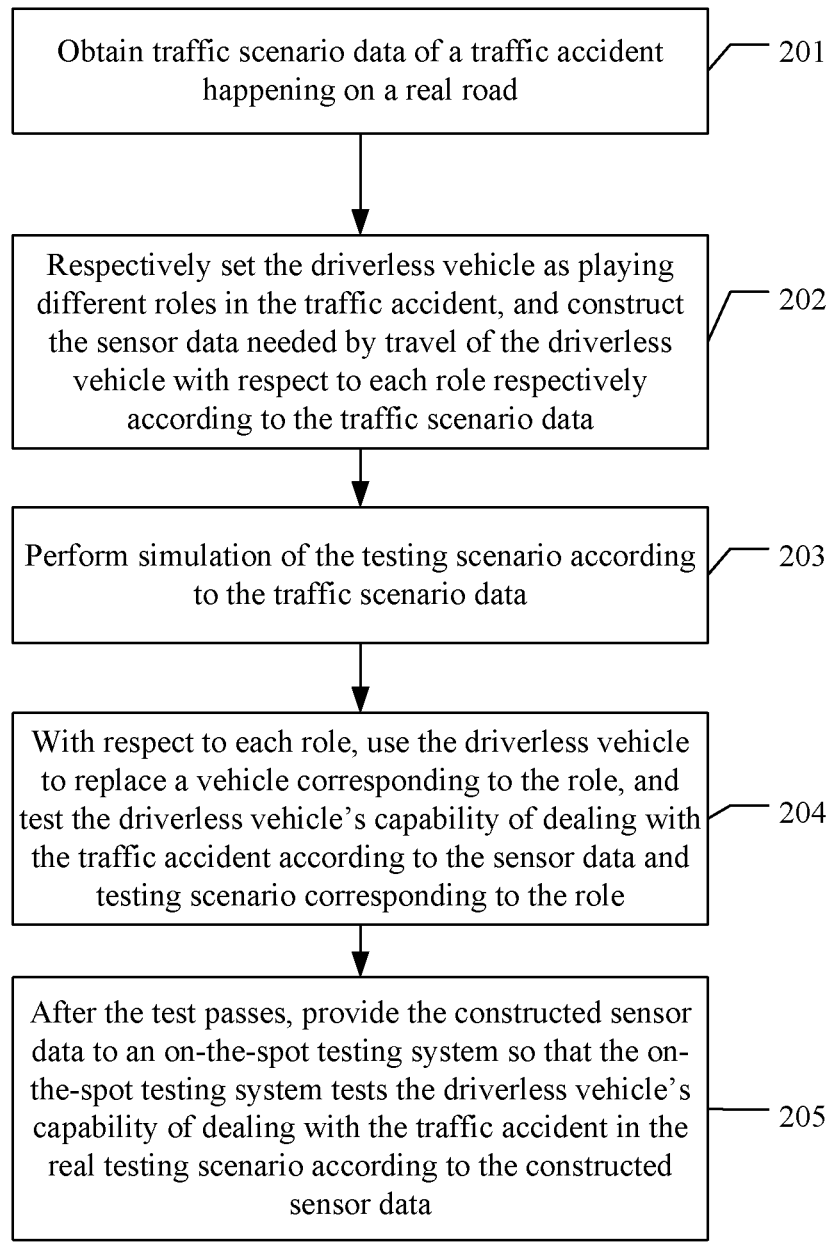
FIG. 2 is a flow chart of a second embodiment of a driverless vehicle testing method according to the present disclosure.

Based on the above introduction, FIG. 2 is a flow chart of a second embodiment of a driverless vehicle testing method according to the present disclosure. As shown in FIG. 2, the embodiment comprises the following specific implementation mode.

In 201 is obtained traffic scenario data of a traffic accident happening on a real road.

Regarding the traffic accident happening on a real road, it is feasible to obtain vehicle data collected by vehicles in the traffic accident, and obtain monitoring data of a traffic monitoring platform.

In 202, it is feasible to respectively set the driverless vehicle as playing different roles in the traffic accident, and construct the sensor data needed by travel of the driverless vehicle with respect to each role respectively according to the traffic scenario data.

It is feasible to perform processing for data in the traffic scenario data, such as multi-sensor data cross validation, secondary processing, data fusion and the like, to construct the desired sensor data.

In 203, simulation of the testing scenario is performed according to the traffic scenario data.

It is feasible to perform processing for data in the traffic scenario data, such as multi-sensor data cross validation, secondary processing, data fusion and the like, to reconstruct the traffic scenario corresponding to the traffic accident through a simulation platform.

In 204, it is feasible to, with respect to each role, use the driverless vehicle to replace a vehicle corresponding to the role, and test the driverless vehicle's capability of dealing with the traffic accident according to the sensor data and testing scenario corresponding to the role.

That is, it is possible to use the driverless vehicle to respectively replace vehicles in different roles in the traffic scenario corresponding to the traffic accident, and respectively perform test for the driverless vehicle's capability of dealing with the traffic accident with respect to different roles.

In 205, after the test passes, the constructed sensor data is provided to an on-the-spot testing system so that the on-the-spot testing system tests the driverless vehicle's capability of dealing with the traffic accident in the real testing scenario according to the constructed sensor data.

That is, on-the-spot test is further performed for the driverless vehicle after the simulated test passes.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In addition, in the above embodiments, different emphasis is placed on respective embodiments, and reference may be made to related depictions in other embodiments for portions not detailed in a certain embodiment.

The above introduces the method embodiments. The solution of the present disclosure will be further described through an apparatus embodiment.

Figure 3:
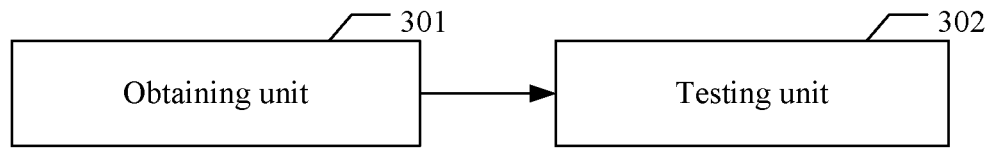
FIG. 3 is a structural schematic diagram of components of an embodiment of a driverless vehicle testing apparatus according to the present disclosure.

FIG. 3 is a structural schematic diagram of components of an embodiment of a driverless vehicle testing apparatus according to the present disclosure. As shown in FIG. 3, the apparatus comprises an obtaining unit 301 and a testing unit 302.

The obtaining unit 301 is configured to obtain traffic scenario data of a traffic accident happening on a real road.

The testing unit 302 is configured to construct sensor data needed by travel of driverless vehicle according to the traffic scenario data, perform simulation of the testing scenario according to the traffic scenario data, and test the driverless vehicle's capability of dealing with the traffic accident according to the sensor data and testing scenario.

Regarding the traffic accident happening on the real road, the obtaining unit 301 is configured to obtain vehicle data collected by vehicles in the traffic accident, and obtain monitoring data of a traffic monitoring platform.

In addition, the obtaining unit 301 is configured to obtain traffic scenario data in a time period between a time point which is at a predetermined time length before time of happening of the traffic accident and the time of happening of the traffic accident.

The testing unit 302 is configured to perform processing for data in the traffic scenario data, such as multi-sensor data cross validation, secondary processing, data fusion and the like, to construct data of sensors needed by the travel of the driverless vehicle, and construct a simulated testing scenario, thereby restoring a traffic scenario corresponding to the real traffic accident as much as possible.

Then, the testing unit 302 is configured to perform test for the driverless vehicle's capability of dealing with the traffic accident according to the constructed sensor data and testing scenario.

As can be seen from the above, the solution stated in the above embodiment is employed to construct the simulated testing scenario according to the traffic scenario data corresponding to the traffic accident that really happens, and furthermore, the driverless vehicle's sensor data also come from the traffic scenario data corresponding to the traffic accident that really happens. Therefore, the obtained testing scenario and testing procedure can better reflect real situations and thereby improve the accuracy of the testing results.

In addition, a role of the driverless vehicle may be changed when the test is performed.

That is, the testing unit 302 is configured to set the driverless vehicle as playing different roles in the traffic accident, and construct the sensor data needed by travel of the driverless vehicle with respect to each role.

Furthermore, as for each role, the testing unit 302 may use the driverless vehicle to replace the vehicle playing this role, and test the driverless vehicle's capability of dealing with the traffic accident according to the sensor data and testing scenario corresponding to the role.

Different roles may comprise: no responsible, semi-responsible and totally responsible.

The test of the driverless vehicle changing different roles is implemented in the above processing manner, thereby sufficiently using the testing data and testing scenario, increasing the testing intensity and reducing the scenario-constructing costs.

In addition, after the test in the simulated testing scenario passes, the testing unit 302 may provide the constructed sensor data to an on-the-spot testing system so that the on-the-spot testing system tests the driverless vehicle's capability of dealing with the traffic accident in the real testing scenario according to the sensor data.

That is, it is possible, in the real testing scenario, use the constructed sensor data to simulate respective real sensor data, validate the driverless vehicle's actual vehicle-controlling capability, and further evaluate and analyze the driverless vehicle's capability of dealing with the traffic accident.

Likewise, the driverless vehicle's capability of dealing with the traffic accident in different roles may be tested respectively.

Plural validation of the on-the-spot test and simulation test is achieved in the above processing manner, thereby further improving the testing performance and ensuring the driverless vehicle's travel safety.

Reference may be made to corresponding depictions in the aforesaid method embodiment for a specific workflow of the apparatus embodiment shown in FIG. 3. The workflow is not detailed any more.

Figure 4:
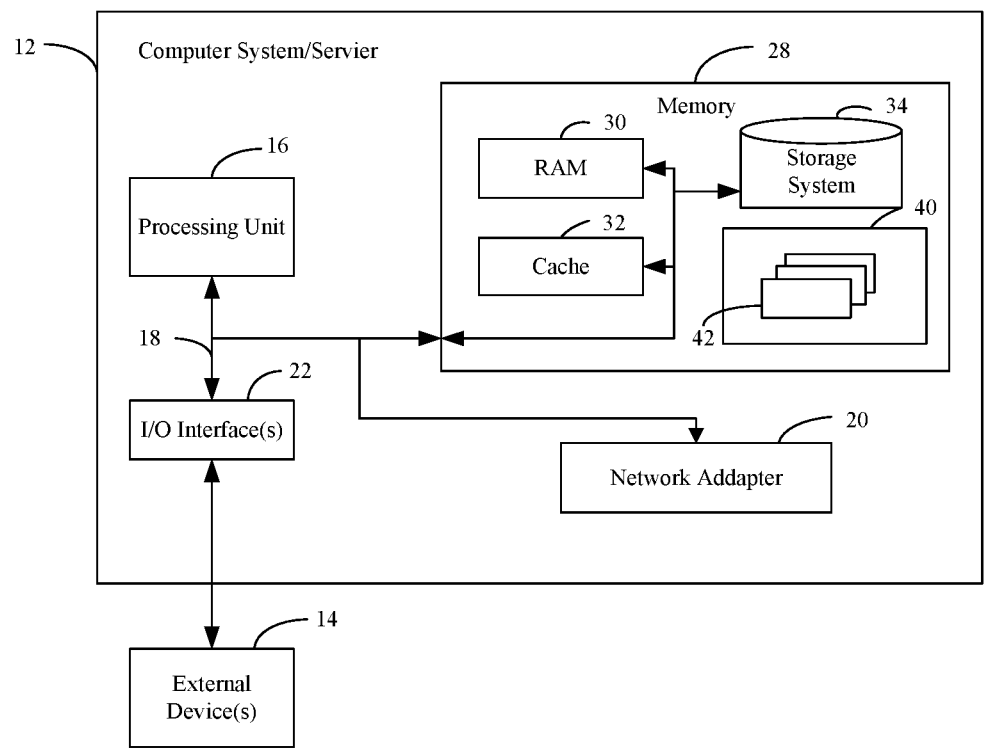
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, obtaining traffic scenario data of a traffic accident happening on a real road, constructing sensor data needed by travel of driverless vehicle according to the traffic scenario data, performing simulation of the testing scenario according to the traffic scenario data, and testing the driverless vehicle's capability of dealing with the traffic accident according to the sensor data and testing scenario.

Reference may be made to related depictions in the above embodiments for specific implementations, which will not be detailed any more.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method comprising:
    obtaining traffic scenario data of a traffic accident on a real road involving a plurality of vehicle roles, wherein the traffic scenario data is obtained in a predetermined time period until the moment of the traffic accident;
    constructing, on a simulation platform, a testing scenario according to the traffic scenario data, wherein the testing scenario includes positions, travel speed, and directions of the plurality of vehicle roles which change over time;
    constructing, according to the traffic scenario data, sensor data needed to simulate driving of an autonomous vehicle which is to be set as replacing a vehicle role of the plurality of vehicle roles for the testing scenario on the simulation platform according to the traffic scenario data; and
    performing, on the simulation platform, a simulation test for the autonomous vehicle in the testing scenario by replacing the vehicle role in the traffic accident with the autonomous vehicle which performs decision-making control operations according to the sensor data over time, so as to avoid the traffic accident.

2. The method according to claim 1, wherein the obtaining the traffic scenario data of the traffic accident on the real road comprises:
    obtaining vehicle data collected by vehicles in the traffic accident, and
    obtaining monitoring data of a traffic monitoring platform.

3. The method according to claim 1, wherein the constructing the sensor data needed to simulate the driving of the autonomous vehicle for the testing scenario according to the traffic scenario data comprises:
    setting the autonomous vehicle as playing different roles in the traffic accident, and
    constructing the sensor data needed to simulate the driving of the autonomous vehicle with respect to each role; and the performing the simulation test for the autonomous vehicle's capability of dealing with the traffic accident according to the sensor data and the testing scenario comprises:
    with respect to each role, using the autonomous vehicle to replace a vehicle playing in the role, and
    testing the autonomous vehicle's capability of dealing with the traffic accident according to the sensor data and testing scenario corresponding to the role.

4. The method according to claim 1, wherein after testing the autonomous vehicle's capability of dealing with the traffic accident, the method further comprises:
    if the simulation test passes, providing the sensor data to an on-the-spot testing system so that the on-the-spot testing system tests the autonomous vehicle's capability of dealing with the traffic accident in a real testing scenario according to the sensor data.

5. A computer device, comprising a memory, a processor, and a computer program which is stored on the memory and runs on the processor, wherein the processor, upon executing the program, implements the following operation:
    obtaining traffic scenario data of a traffic accident on a real road involving a plurality of vehicle roles, wherein the traffic scenario data is obtained in a predetermined time period until the moment of the traffic accident;
    constructing, on a simulation platform, a testing scenario according to the traffic scenario data, wherein the testing scenario includes positions, travel speed, and directions of the plurality of vehicle roles which change over time;
    constructing, according to the traffic scenario data, sensor data needed to simulate driving of an autonomous vehicle which is to be set as replacing a vehicle role of the plurality of vehicle roles for the testing scenario on the simulation platform; and
    performing, on the simulation platform, a simulation test for the autonomous vehicle in the testing scenario by replacing the vehicle role in the traffic accident with the autonomous vehicle which performs decision-making control operations according to the sensor data over time, so as to avoid the traffic accident.

6. The computer device according to claim 5, wherein the obtaining the traffic scenario data of the traffic accident on the real road comprises:
    obtaining vehicle data collected by vehicles in the traffic accident, and
    obtaining monitoring data of a traffic monitoring platform.

7. The computer device according to claim 5, wherein the constructing the sensor data needed to simulate the driving of the autonomous vehicle for the testing scenario according to the traffic scenario data comprises:
    setting the autonomous vehicle as playing different roles in the traffic accident, and
    constructing the sensor data needed to simulate the driving of the autonomous vehicle with respect to each role; and
    the performing the simulation test for the autonomous vehicle's capability of dealing with the traffic accident according to the sensor data and the testing scenario comprises:
    with respect to each role, using the autonomous vehicle to replace a vehicle playing in the role, and
    testing the autonomous vehicle's capability of dealing with the traffic accident according to the sensor data and testing scenario corresponding to the role.

8. The computer device according to claim 5, wherein after testing the autonomous vehicle's capability of dealing with the traffic accident, the method further comprises:
    if the simulation test passes, providing the sensor data to an on-the-spot testing system so that the on-the-spot testing system tests the autonomous vehicle's capability of dealing with the traffic accident in a real testing scenario according to the sensor data.

9. A non-transitory computer-readable storage medium on which a computer program is stored, wherein the computer program, when executed by the processor, implements the following operation:
    obtaining traffic scenario data of a traffic accident on a real road involving a plurality of vehicle roles, wherein the traffic scenario data is obtained in a predetermined time period until the moment of the traffic accident;
    constructing, on a simulation platform, a testing scenario according to the traffic scenario data, wherein the testing scenario includes positions, travel speed and directions of the plurality of vehicle roles which change over time;
    constructing, according to the traffic scenario data, sensor data needed to simulate driving of an autonomous vehicle which is to be set as replacing a vehicle role of the plurality of vehicle roles for the testing scenario on the simulation platform; and
    performing, on the simulation platform, a simulation test for the autonomous vehicle in the testing scenario by replacing the vehicle role in the traffic accident with the autonomous vehicle which performs decision-making control operations according to the sensor data.

10. The non-transitory computer-readable storage medium according to claim 9, wherein the obtaining the traffic scenario data of the traffic accident on the real road comprises:
    obtaining vehicle data collected by vehicles in the traffic accident, and
    obtaining monitoring data of a traffic monitoring platform.

11. The non-transitory computer-readable storage medium according to claim 9, wherein the constructing the sensor data needed to simulate the driving of the autonomous vehicle for the testing scenario according to the traffic scenario data comprises:
    setting the autonomous vehicle as playing different roles in the traffic accident, and
    constructing the sensor data needed to simulate the driving of the autonomous vehicle with respect to each role; and
    the performing the simulation test for the autonomous vehicle's capability of dealing with the traffic accident according to the sensor data and the testing scenario comprises:
    with respect to each role, using the autonomous vehicle to replace a vehicle playing in the role, and
    testing the autonomous vehicle's capability of dealing with the traffic accident according to the sensor data and testing scenario corresponding to the role.

12. The non-transitory computer-readable storage medium according to claim 9, wherein after testing the autonomous vehicle's capability of dealing with the traffic accident, the method further comprises:
    if the simulation test passes, providing the sensor data to an on-the-spot testing system so that the on-the-spot testing system tests the autonomous vehicle's capability of dealing with the traffic accident in a real testing scenario according to the sensor data.

* * * * *